March 24, 1936.  W. H. FITCH  2,035,309

RECUPERATOR WALL

Filed June 12, 1933

INVENTOR.
WILLIAM H. FITCH.
BY R. C. Benner
ATTORNEY.

Patented Mar. 24, 1936

2,035,309

UNITED STATES PATENT OFFICE 2,035,309

RECUPERATOR WALL

William H. Fitch, Plainfield, N. J.

Application June 12, 1933, Serial No. 675,401

5 Claims. (Cl. 263—51)

This invention relates to recuperator wall structure and to the type of recuperator in which the heat transfer is effected through the walls of non-metallic tubes. The invention relates more particularly to the construction of the refractory blocks in those portions of the wall that are subject to the greatest thermal changes and where leakage is most likely to occur.

My United States Patent No. 1,735,607 discloses an industrial furnace which is provided with a recuperator in which the heat transfer between the combustion gases and air to be preheated takes place principally through the walls of short tubes. Practically all recuperators of this type are supplied with air by means of a pump which causes air to flow through the recuperator tubes under increased or reduced pressure and at a relatively high velocity in order to obtain a high rate of heat transfer through the walls which separate the hot combustion gases from the air to be heated.

The efficiency of such recuperators depends, among other things, on the amount of heat lost by leakage of the preheated air to the waste gas flue or to the atmosphere. Such leakage occurs especially when the air which is being heated is at a pressure greater than atmospheric and when the furnace is used intermittently. Alternate expansion and contraction of the tubes and of the walls of the recuperator chamber tend to open up joints and seams which reduce the efficiency of the recuperator and of the furnace operation. When the changes of temperature in the recuperator are small and the operation of the furnace is of a steady character extending over prolonged periods, the loosening of the joints and the resultant leakage are correspondingly low.

In the type of industrial furnace disclosed in my Patent No. 1,735,607 the heat transfer elements or tubes are preferably made of bonded silicon carbide where the tubes are subjected to high flue gas temperatures. Bonded silicon carbide (known for example under the trade name "Carbofrax") has great physical strength at high temperatures and withstands the action of ordinary furnace gases for long periods when the silicon carbide is suitably bonded. As the tubes are made in one piece and are not of great length, the expansion and contraction of the tubes where they contact with their supporting walls is not very large.

The walls which support the ends of the recuperator tubes may be called the tube terminal walls. These tube terminal walls and the side walls of the recuperator chamber are usually made of fire-clay. One of the principal problems with which this invention is concerned is therefore the construction of refractory blocks for the tube terminal walls of such a character that leakage can be greatly reduced. Some reasons for the use of two different materials in the construction of a recuperator are to be found in the high thermal conductivity of silicon carbide (about nine times that of fire-clay, which makes it a valuable material for heat transfer), and the lower cost of fire-clay which renders it desirable for portions of the recuperator where heat transfer is not desired. The greatest temperature stresses in the fire-clay blocks occur in the tube terminal wall which supports the ends of the tubes through which cold air enters. The recuperator tubes are subjected to considerably higher temperatures than the outer faces of the terminal blocks, especially those adjacent the ends where the cold air enters. Thus opening of the joints between the blocks and tubes with loosening of the recuperator tubes from the fire-clay supports, due to differences in thermal expansion, is likely to cause leakage which may have various bad effects. If the pressure in the stack is higher than in the air chambers, leakage of combustion gases into the interior of the recuperator tubes interferes with the operation of the burners and decreases combustion efficiency. If the pressure is higher in the opposite direction, leakage of air into the space occupied by combustion gases diminishes the supply of combustion air, decreases the efficiency of heat recovery and interferes with the furnace draft. The tube terminal walls perform, therefore, a very important function, and improvement in the air tightness construction of this wall is highly desirable from the standpoint of maintaining efficiency.

In the recuperator shown in my Patent No. 1,735,607 the tube terminal walls were made of blocks whose general shape was that of a rectangular parallelopiped, the faces of the blocks being plane except where provision is made for receiving in close contact the cylindrical surfaces of the tube ends. These tube terminal walls were jointed to the side walls of the recuperator by extending the tube terminal walls into recesses in the side walls. Each tube terminal wall separates an air chamber from another chamber containing combustion gases. The operation of most of these furnaces is continuous; however many small melting one way furnaces operate intermittently. This latter type of operation tends to loosen the recuperator tubes from their supports and to open up cracks between them during the periods of large temperature variations with the result that the leakage of hot air increases with the age of the installation and decreases the efficiency of the recuperator. Inspection has also shown that much of the leakage obtained at higher air pressure takes place between the tube terminal walls and the side walls. While the joints at the ends of the tubes therefore may be perfectly satisfactory, the leakage between the tube terminal walls and the side walls reduces the efficiency of the recuperator. I have discovered that the leakage in the recuperator chamber walls can be reduced by making the walls of refractory blocks having undercut edges and by providing suitable calking for sealing the joints of said blocks.

My invention is illustrated by the accompanying drawing in which.

Figure 4:
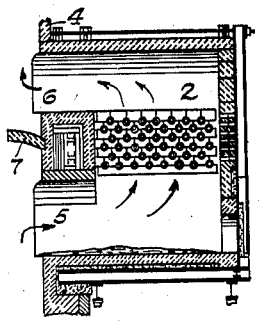
Figure 4 is a sectional elevation of the recuperator chamber with an indication at the left of its connections with a furnace stack that is not shown.
Figure 1:
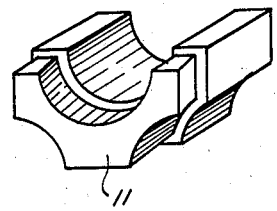
Figure 1 is a perspective view of one of the blocks used according to the invention in a wall that supports terminal portions of recuperator tubes.

Referring to the drawing in detail, a recuperator chamber 2 is provided with recuperator tubes 1 for heating air that is passed therethrough, and is mounted on posts to connect it to a stack 4 at some distance above the floor. Flue gases enter the recuperator chamber from the stack by means of an inlet 5 and after passing up and around the recuperator tubes re-enter the stack through an outlet 6. The baffle 7 prevents the flue gases from going directly up the stack without passing through the recuperator chamber. The air to be heated by the recuperator passes through a screen into the ends of the tubes 1 (see also Fig. 2) which are supported by the tube terminal wall 9, thence along the tubes and out into a conduit along which the preheated air passes to fuel burners. The air in passing through a recuperator tube is compelled to flow close to the interior surface by means of the "corebuster" 8 which is indicated in Figure 3. The "corebuster" is supported in an axial position in the recuperator tube by means of a number of projections or feet as indicated in Figure 3.

Figure 2:
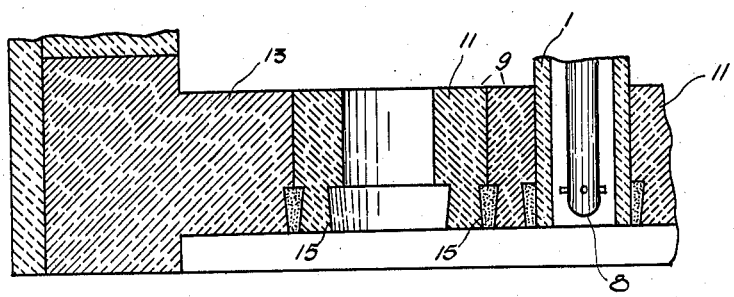
Figure 2 is a fragmentary horizontal section of a wall used to support recuperator tubes, the tube being omitted from its supporting socket at the left to illustrate the character of the opening in the wall before a tube is inserted, and the section of the tube terminal wall being taken approximately on the line II—II of Figure 3, while a fragment of the side wall is shown at the left of Fig. 2.
Figure 3:
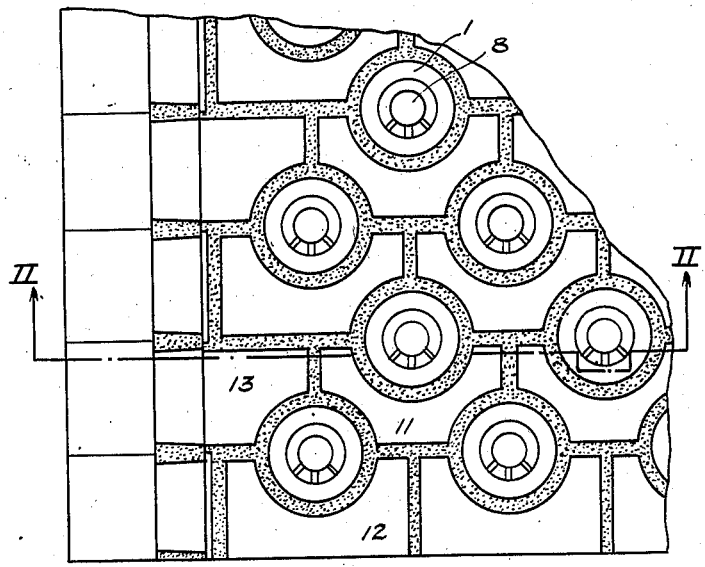
Figure 3 is a fragmentary elevation showing a portion of the outer surface of the tube terminal wall where the air to be heated enters.

The tube terminal walls are composed of blocks of the types indicated in Figures 2 and 3 by means of the reference characters 11, 12, and 13. Modifications of these blocks are used in certain positions, as for example in the top layer on the tube terminal wall. The block 11 has a semi-circular groove on its top side for the support of a recuperator tube and quadrantal grooves at each of its lower corners for use in covering portions of other recuperator tubes. The blocks 12 are used for the bottom layer of a tube terminal wall. The blocks 13 are used in joining the tube terminal walls to the side walls. These blocks are, in general, undercut as at 15 to permit reinforcement of the joints between the blocks and tubes and between the blocks themselves. As pointed out above the tubes are more highly heated when in service than the terminal blocks (and the walls as a whole). They therefore tend to expand when the recuperator is in service in such a way as to thrust harder on the terminal blocks. With my type of construction this is turned to advantage in that the calking cement in the grooves is squeezed down into the narrower part of the groove at such times, hence sealing the joint tighter rather than loosening up in the normal manner. For this purpose the grooves bounded by the undercut surfaces are filled or calked with a plastic cement such as that known by the trade name "Stic-Tite". The effect of the heating of the furnace is to expand the various fire-clay blocks 11, 12, 13 constituting the tube terminal wall. This expansion of the fire-clay blocks tends to tighten the plastic cement in the joints and hence reduces the leakage between the tube terminal walls and the side walls and through the tube terminal wall itself.

In constructing the tube terminal walls, blocks of the types 11, 12, 13 and similar special blocks are set up with a layer of refractory cement in the joints between the blocks. When the blocks of the tube terminal wall have been set up, there are cylindrical openings whose diameters are but slightly greater than the recuperator tubes except where the blocks are undercut as at 15. When the tubes are in place, the spaces left by the undercutting of the blocks are filled with a plastic cement. These spaces filled in the manner just described are readily accessible for refilling or calking if leaks should develop during the operation of the furnace. The tubes can also be dug out by removing the calking material when breakage of the tubes makes this necessary.

The difficulties in maintaining the heat transmitting elements of a recuperator in good condition are understood by those skilled in the furnace art. Silicon carbide is a good material for the walls of recuperator tubes by reason of its good thermal conductivity and its great mechanical strength at high temperatures as well as its resistance to chemical reactions. The applicant has described in the present application the best method known to him for mounting the silicon carbide tubes in fire-clay walls. This method of mounting has been tried out with success by the applicant and his associates in furnace practice, and has proved of marked advantage over the older methods.

I claim:

1. A recuperator wall element for use in supporting a terminal portion of a recuperator tube, said element comprising a refractory block having a semi-circular groove on its upper side and a quadrantal groove at one or both of its lower corners, said grooves being enlarged at one end for calking with a plastic cement.

2. A recuperator wall which bounds a chamber containing hot burned gases in motion and which supports terminal portions of heat exchange tubes made from non-metallic material of high thermal conductivity, one of the tube terminal wall sections being principally comprised of blocks made of non-metallic material of low thermal conductivity and grooved on its upper surface and at each of its lower corners for the reception of respective tubes so that straight joints between the tubes extend only short distances which are of the order of magnitude of the diameter of a tube, and T-shaped blocks connecting said tube terminal wall section to the side wall sections to reduce leakage at the corresponding corners of the chamber.

3. A recuperator wall which bounds a chamber containing hot furnace gases that flow around air tubes whose walls are composed of non-metallic material of high thermal conductivity, one of the wall sections being principally comprised of blocks of poorly conducting refractory, each of the blocks in the main portion of the wall being grooved on its upper surface to extend under approximately half of the circumference of the air tube which it supports and being grooved at each of its lower corners to extend over approximately a fourth of the circumference of an air tube, and T-shaped blocks connecting said tube terminal wall section with each of the side wall sections to reduce the leakage at the corresponding corners of the chamber.

4. A recuperator wall which bounds a chamber containing hot furnace gases in motion and which supports terminal portions of silicon carbide heat exchange tubes, said wall being principally comprised of blocks of poorly conducting refractory that are each shaped to provide a semi-circular groove under a heat exchange tube and to provide quadrantal grooves over other heat exchange tubes whereby straight joints between the tubes extend only short distances which are of the order of magnitude of the diameter of a tube.

5. A wall for a recuperator chamber and for the support of terminal portions of a plurality of air heating tubes, said wall comprising blocks separated by joints, said joints having straight portions extending only for a distance which is of the order of magnitude of the diameter of a recuperator tube whereby the tendency to the formation of cracks along joint planes is decreased, and in which the edges of the blocks adjacent the air inlets are undercut and calked with a plastic cement to reduce leakage under alternations of temperature.

WILLIAM H. FITCH.